United States Patent
Liu

(10) Patent No.: US 11,197,191 B2
(45) Date of Patent: Dec. 7, 2021

(54) METHOD AND APPARATUS FOR TRANSMITTING USER DATA UNDER CONGESTION CONTROL IN WIRELESS COMMUNICATIONS

(71) Applicant: MediaTek Inc., Hsinchu (TW)

(72) Inventor: Ren-Huang Liu, Hsinchu (TW)

(73) Assignee: MediaTek Inc.

( * ) Notice: Subject to any disclaimer, the term of this patent is extended or adjusted under 35 U.S.C. 154(b) by 0 days.

(21) Appl. No.: 16/265,001

(22) Filed: Feb. 1, 2019

(65) Prior Publication Data

US 2020/0252826 A1 Aug. 6, 2020

(51) Int. Cl.
*H04W 28/02* (2009.01)
*H04W 28/06* (2009.01)
*H04W 4/80* (2018.01)
*H04W 76/18* (2018.01)
*H04W 8/08* (2009.01)

(52) U.S. Cl.
CPC ......... *H04W 28/0289* (2013.01); *H04W 4/80* (2018.02); *H04W 8/08* (2013.01); *H04W 28/0252* (2013.01); *H04W 28/06* (2013.01); *H04W 76/18* (2018.02)

(58) Field of Classification Search
CPC ... H04W 28/0289; H04W 76/18; H04W 4/80; H04W 8/08; H04W 28/0252; H04W 28/06
USPC ......................................... 370/310, 328, 329
See application file for complete search history.

(56) References Cited

U.S. PATENT DOCUMENTS

| | | | |
|---|---|---|---|
| 2013/0029631 A1* | 1/2013 | Tiwari | H04W 4/90 455/404.1 |
| 2013/0336218 A1* | 12/2013 | Gupta | H04W 76/11 370/328 |
| 2015/0296321 A1* | 10/2015 | Kim | H04W 72/0446 370/329 |
| 2016/0374104 A1* | 12/2016 | Watfa | H04W 72/10 |
| 2018/0098240 A1* | 4/2018 | Griot | H04W 28/0273 |
| 2019/0014530 A1* | 1/2019 | Aghili | H04W 48/08 |
| 2019/0014612 A1* | 1/2019 | Lee | H04W 68/02 |
| 2019/0116483 A1* | 4/2019 | Ryu | H04W 68/02 |

(Continued)

FOREIGN PATENT DOCUMENTS

| | | |
|---|---|---|
| WO | WO 2017164679 A1 | 9/2017 |
| WO | WO 2018063800 A1 | 4/2018 |
| WO | WO 2018070172 A1 | 4/2018 |

OTHER PUBLICATIONS

Taiwan Intellectual Property Office, Office Action for Taiwan Patent Application No. 108144072, dated Nov. 19, 2020.

(Continued)

*Primary Examiner* — Obaidul Huq
(74) *Attorney, Agent, or Firm* — Han IP PLLC; Andy M. Han

(57) ABSTRACT

Various solutions for transmitting user data under congestion control with respect to user equipment and network apparatus in wireless communications are described. An apparatus may establish a control plane connection to transmit user data. The apparatus may determine whether a back-off timer is running. The apparatus may establish a user plane connection when the back-off timer is running. The apparatus may transmit the user data via the user plane connection.

18 Claims, 7 Drawing Sheets

(56) References Cited

U.S. PATENT DOCUMENTS

2019/0320485 A1* 10/2019 Kim ..................... H04W 4/80
2020/0037203 A1*  1/2020 Ianev .................. H04W 28/06

OTHER PUBLICATIONS

3GPP TS 24.301 V15.5.0; Technical Specification Group Core Network and Terminals; Non-Access-Stratum (NAS) protocol for Evolved Packet System (EPS); Stage 3 (Release 15), Dec. 21, 2018.
Taiwan Intellectual Property Office, Office Action for Taiwan Patent Application No. 108144072, dated May 13, 2021.
China National Intellectual Property Administration, Office Action for China Patent Application No. 201911214925.5, dated Sep. 3, 2021.

* cited by examiner

METHOD AND APPARATUS FOR TRANSMITTING USER DATA UNDER CONGESTION CONTROL IN WIRELESS COMMUNICATIONS

TECHNICAL FIELD

The present disclosure is generally related to wireless communications and, more particularly, to transmitting user data under congestion control with respect to user equipment and network apparatus in wireless communications.

BACKGROUND

Unless otherwise indicated herein, approaches described in this section are not prior art to the claims listed below and are not admitted as prior art by inclusion in this section.

In a communication network, the user equipment (UE) may establish a control plane connection with the network for transmitting the control information. The UE may also establish a user plane connection with the network for transmitting the user data. Generally, the user data should be transmitted via user plane connections which may require more signaling message to establish the user plane bearers. For some internet of things (IoT) applications such as, for example and without limitations, cellular internet of things (CIoT), narrow band internet of things (NB-IoT) or machine type communications (MTC), the amount of user data may be typically small. It may not be cost-efficient to establish the user plane bearer to send the small user data. Therefore, the control plane CIoT evolved packet system (EPS) optimization is proposed to enable efficient transport of the user data over control plane connections. The user data may comprise internet protocol (IP) packets, non-IP packets or short message services (SMS).

However, in some scenarios, when the network node is overloaded, the network node may use a back-off timer value in a session management message to regulate the time interval within which the UE is not allowed to retry the same procedure for congestion control. For example, the network node may use a back-off timer to disallow the UE to initiate transfer of user data via the control plane connection. In such case, the UE may not be able to transmit user data via the control plane connection until the back-off timer is expired.

Accordingly, how to handle the congestion control to avoid long waiting due to the back-off timer may affect UE's performance and the user experiences. It is needed to provide proper schemes for transmitting user data when the congestion control is active.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to transmitting user data under congestion control with respect to user equipment and network apparatus in mobile communications.

In one aspect, a method may involve an apparatus establishing a control plane connection to transmit user data. The method may also involve the apparatus determining whether a back-off timer is running. The method may further involve the apparatus establishing a user plane connection when the back-off timer is running. The method may further involve the apparatus transmitting the user data via the user plane connection.

In one aspect, a method may involve an apparatus establishing a user plane connection to transmit user data. The method may also involve the apparatus determining whether a back-off timer is running. The method may further involve the apparatus establishing a control plane connection when the back-off timer is running. The method may further involve the apparatus transmitting the user data via the control plane connection.

In one aspect, an apparatus may comprise a transceiver capable of wirelessly communicating with a plurality of nodes of a wireless network. The apparatus may also comprise a processor communicatively coupled to the transceiver. The processor may be capable of establishing a control plane connection to transmit user data. The processor may also be capable of determining whether a back-off timer is running. The processor may further be capable of establishing a user plane connection when the back-off timer is running. The processor may further be capable of transmitting the user data via the user plane connection.

In one aspect, an apparatus may comprise a transceiver capable of wirelessly communicating with a plurality of nodes of a wireless network. The apparatus may also comprise a processor communicatively coupled to the transceiver. The processor may be capable of establishing a user plane connection to transmit user data. The processor may also be capable of determining whether a back-off timer is running. The processor may further be capable of establishing a control plane connection when the back-off timer is running. The processor may further be capable of transmitting the user data via the control plane connection.

It is noteworthy that, although description provided herein may be in the context of certain radio access technologies, networks and network topologies such as Global System for Mobile communications (GSM), Universal Mobile Telecommunications System (UMTS), Long-Term Evolution (LTE), LTE-Advanced, LTE-Advanced Pro, 5th Generation (5G), New Radio (NR), internet of things (IoT), cellular internet of things (CIoT), narrow band internet of things (NB-IoT) and machine type communications (MTC), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Figure 1:
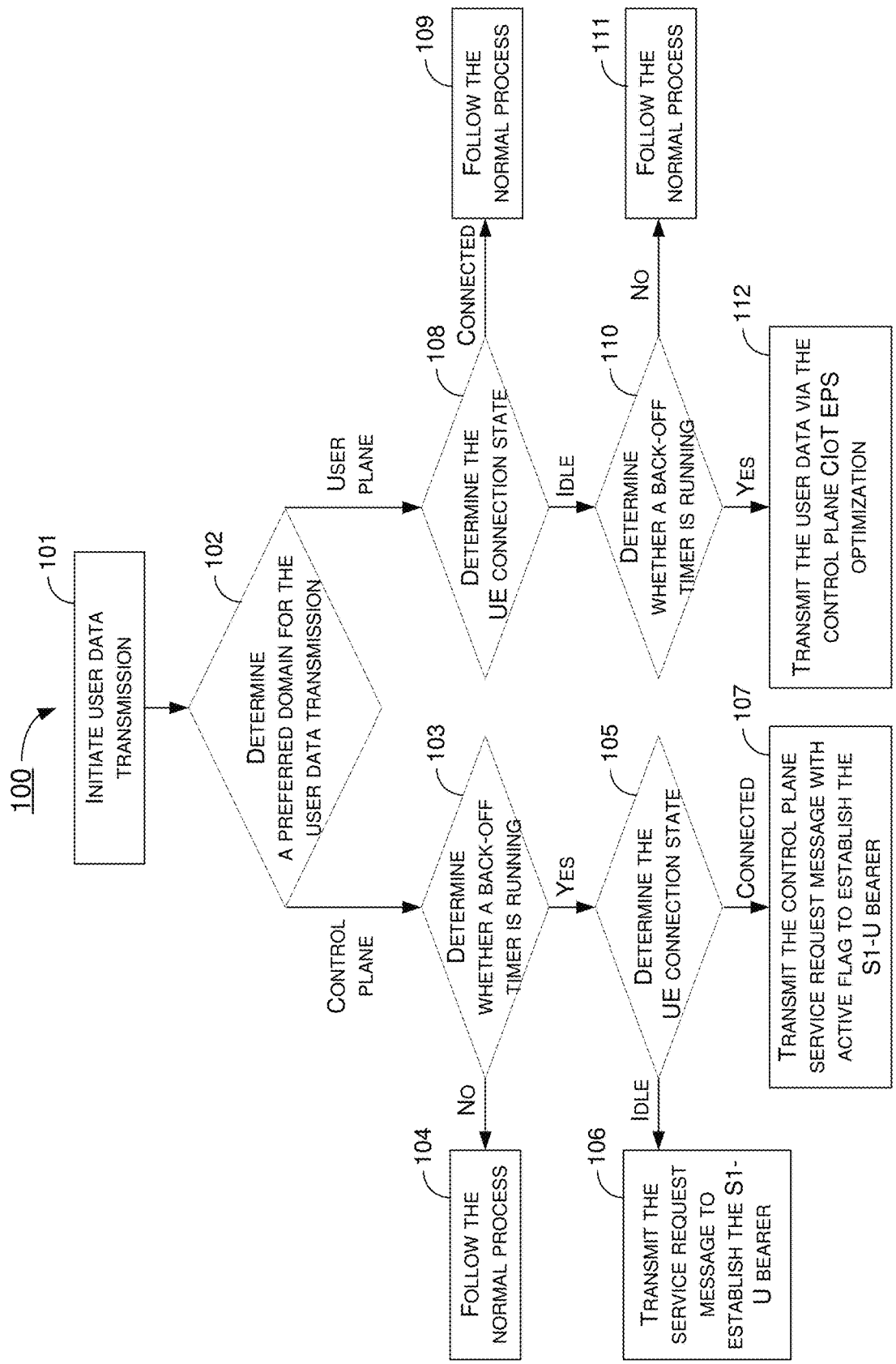
FIG. 1 is a diagram depicting an example scheme under schemes in accordance with implementations of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to transmitting user data under congestion control with respect to user equipment and network apparatus in wireless communications. According to the present disclosure, a number of possible solutions may be implemented separately or jointly. That is, although these possible solutions may be described below separately, two or more of these possible solutions may be implemented in one combination or another.

Generally, the user data should be transmitted via user plane connections which may require more signaling message to establish the user plane bearers. For some IoT applications such as, for example and without limitations, CIoT, NB-IoT or MTC, the amount of user data may be typically small. It may not be cost-efficient to establish the user plane bearer to send the small user data. Therefore, the control plane CIoT EPS optimization is proposed to enable efficient transport of the user data over control plane connections. The user data may comprise IP packets, non-IP packets or SMS.

However, in some scenarios, when the network node (e.g., Mobility Management Entity (MME)) is overloaded, the network node may use a back-off timer value in a session management message to regulate the time interval within which the UE is not allowed to retry the same procedure for congestion control. For example, the network node may use a back-off timer to disallow the UE to initiate transfer of user data via the control plane connection. The back-off timer may comprise a control plane data back-off timer T3448 which may be carried in an attach accept message, a service reject message, a service accept message or a tracking area update accept message. In such case, the UE may not be able to transmit user data via the control plane connection until T3448 is expired.

In view of the above, the present disclosure proposes a number of schemes pertaining to transmitting user data under congestion control. According to the schemes of the present disclosure, when the UE is disallowed to transmit the user data via the control plane connection due to a back-off timer, the UE may be able to transmit the user data via the user plane connection instead of waiting for the expiration of the back-off timer. Alternatively, when the UE is disallowed to transmit the user data via the user plane connection due to a back-off timer, the UE may be able to transmit the user data via the control plane connection instead of waiting for the expiration of the back-off timer.

FIG. 1 illustrates an example scheme 100 in accordance with implementations of the present disclosure. Scheme 100 may involve a UE and a plurality of network nodes, which may be a part of a wireless communication network (e.g., a GSM network, a UMTS network, an LTE network, an NR network, an IoT network, a CIoT network, an NB-IoT network or an MTC network). The UE may be configured to establish at least one connection with the network nodes. The connection may be established on the control plane or on the user plane. For example, the UE may establish the connection solely on the control plane. Alternatively, the UE may establish the connection solely on the user plane.

Referring to FIG. 1, scheme 100 may involve a number of operations and/or actions performed by the UE for transmitting user data under congestion control as represented by one or more of blocks 101, 102, 103, 104, 105, 106, 107, 108, 109, 110, 111 and 112. Although illustrated as discrete blocks, various blocks of scheme 100 may be divided into additional blocks, combined into fewer blocks, or eliminated, depending on the desired implementation. Scheme 100 may be implemented by communication apparatus 510 described below. Scheme 100 may begin at 101.

At 101, the UE may be configured to initiate user data transmission from the UE to the network nodes. Scheme 100 may proceed from 101 to 102.

At 102, the UE may be configured to determine a preferred domain for the user data transmission. The UE may choose one of the control plane domain or the user plane domain. The UE may determine the preferred domain according to its preferences/configurations. For example, in a case that the user data is small, the UE may choose the control plane for the user data transmission. The UE may also determine the preferred domain according to the network capabilities. For example, some networks may only support one of the control plane or the user plane. The UE may only choose the supported domain for the user data transmission. In a case that the control plane is determined for the user data transmission, scheme 100 may proceed from 102 to 103. In a case that the user plane is determined for the user data transmission, scheme 100 may proceed from 102 to 108.

At 103, the UE may be configured to determine whether a back-off timer is running. Specifically, when the control plane connection is established, the UE may be configured to transmit the user data to the network node (e.g., MME or S-GW) via the base station. However, when the network node is overloaded or busy, the network node may transmit a message (e.g., an attach accept message, a service reject message, a service accept message or a tracking area update accept message) with a back-off timer value to the UE for disallowing the UE to retry the same procedure. The UE may be configured to initiate the back-off timer after receiving the back-off timer value. The UE may not be able to transmit the user data via the control plane connection until the expiration of the back-off timer. The back-off timer may be, for example and without limitations, a control plane data back-off timer T3448. Therefore, the UE may need to determine whether T3448 is running before transmitting the user data. In a case that the back-off timer is not running, scheme 100 may proceed from 103 to 104. In a case that the back-off timer is running, scheme 100 may proceed from 103 to 105.

At 104, the UE may be configured to follow the normal process. In a case that the back-off timer is not running, it means that the network node (e.g., MME/S-GW or base station) may be available. In the normal process, the UE may be able to transmit the user data via the control plane connection.

At 105, the UE may be configured to determine the UE connection state. Specifically, in a case that the back-off timer is running, the UE may be disallowed to transmit the user data via the control plane connection. Correspondingly, the UE may be configured to try to transmit the user data via an alternative connection (e.g., the user plane connection). The UE may need to establish the user plane connection. However, the network side may have different procedures for establishing the user plane connection depending on the connection state of the UE. The UE connection state may comprise an idle mode or a connected mode. The UE may need to transmit the correct message for establishing the user plane connection based on the connection state of the UE. In a case that the UE is operated in the idle mode, scheme 100 may proceed from 105 to 106. In a case that the UE is operated in the connected mode, scheme 100 may proceed from 105 to 107.

At 106, the UE may be configured to transmit a service request message to establish the S1-U bearer. The S1 interface may be used between the base station (e.g., eNB) and the network nodes (e.g., MME or serving gateway (S-GW)). The S1 interface may include the S1-CP (i.e., control plane) and S1-U (i.e., user plane) parts. In order to transmit the use data via the user plane connection, the UE may need to establish the S1-U bearer. The service request message may be used for establishing the S1-U bearer in the idle mode. After the S1-U bearer is established, the UE may be configured to transmit the user data via the user plane connection. The UE may keep transmitting the user data via the user plane connection even after the back-off timer is expired.

At 107, the UE may be configured to transmit a control plane service request message with active flag to establish the S1-U bearer. The control plane service request message with active flag may be used for establishing the S1-U bearer in the connected mode. After the S1-U bearer is established, the UE may be configured to transmit the user data via the user plane connection. The UE may keep transmitting the user data via the user plane connection even after the back-off timer is expired.

At 108, the UE may be configured to determine the UE connection state. Specifically, after choosing the user plane connection for the user data transmission, the UE may establish the user plane connection with the network nodes. When the UE needs to transmit the user data, the UE may further need to determine whether the UE is in the connected mode or in the idle mode. In a case that the UE is operated in the connected mode, scheme 100 may proceed from 108 to 109. In a case that the UE is operated in the idle mode, scheme 100 may proceed from 108 to 110.

At 109, the UE may be configured to follow the normal process. When the UE is operated in the connected mode, the UE may be allowed to transmit the user data. In the normal process, the UE may be able to transmit the user data via the user plane connection.

At 110, the UE may be configured to determine whether a back-off timer is running. Specifically, when the user plane connection is established, the UE may be configured to transmit the user data to the network node (e.g., MME or S-GW) via the base station. However, when the network node is overloaded or busy, the network node may transmit a message (e.g., a service reject message) with a back-off timer value to the UE for disallowing the UE to retry the same procedure. The UE may be configured to initiate the back-off timer after receiving the back-off timer value. The UE may not be able to transmit the user data via the user plane connection until the expiration of the back-off timer. The back-off timer may be, for example and without limitations, a mobility management back-off timer T3346. Therefore, the UE may need to determine whether T3346 is running before transmitting the user data. In a case that the back-off timer is not running, scheme 100 may proceed from 110 to 111. In a case that the back-off timer is running, scheme 100 may proceed from 110 to 112.

At 111, the UE may be configured to follow the normal process. In a case that the back-off timer is not running, it means that the network node (e.g., MME/S-GW or base station) may be available. In the normal process, the UE may be able to transmit the user data via the user plane connection.

At 112, the UE may be configured to transmit the user data via the control plane CIoT EPS optimization. Specifically, in a case that the back-off timer is running, the UE may be disallowed to transmit the user data via the user plane connection. Correspondingly, the UE may be configured to try to transmit the user data via an alternative connection (e.g., the control plane connection). The UE may be configured to establish the control plane connection and transmit the user data via the control plane connection (i.e., the control plane CIoT EPS optimization). The UE may keep transmitting the user data via the control plane connection even after the back-off timer is expired.

Figure 2:
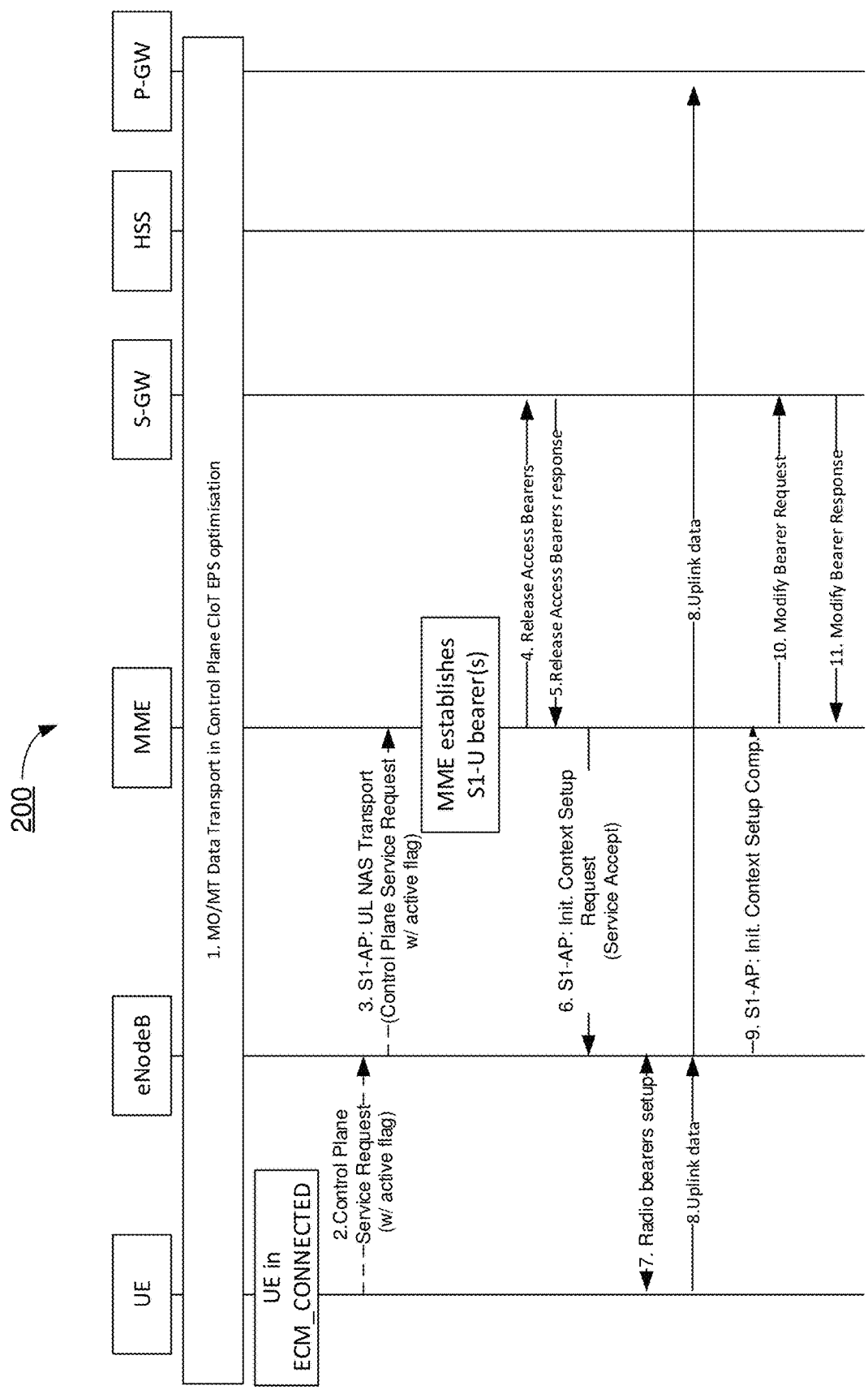
FIG. 2 is a diagram depicting an example scheme under schemes in accordance with implementations of the present disclosure.

FIG. 2 illustrates an example scheme 200 in accordance with implementations of the present disclosure. Scheme 200 may involve a UE and a plurality of network nodes, which may be a part of a wireless communication network (e.g., a GSM network, a UMTS network, an LTE network, an NR network, an IoT network, a CIoT network, an NB-IoT network or an MTC network). Scheme 200 may involve a number of operations and/or steps performed by the UE and/or the network nodes for transmitting user data under congestion control as represented by one or more of operations 1, 2, 3, 4, 5, 6, 7, 8, 9, 10 and 11. Although illustrated as discrete operations, various operations of scheme 200 may be divided into additional sub-operations, combined into fewer operations, or eliminated, depending on the desired implementation. Scheme 200 may begin at operation 1.

At operation 1, the UE may establish the control plane connection with the network nodes (e.g., eNodeB, MME, S-GW, home subscriber server (HSS) and packet data network gateway (P-GW)). The mobile originated (MO) and/or mobile terminated (MT) data transport may be perform via the control plane CIoT EPS optimization.

As described above, the UE may be configured to determine whether a back-off timer (e.g., T3448) is running and determine the connection state of the UE. In scheme 200, the UE may be operated in the connected mode (e.g., EPS connection management (ECM)_CONNECTED). After determining that the back-off timer is running and the UE is in the connected mode, operation 2 may be performed.

At operation 2, the UE may be triggered to establish the user plane bearers and transmit a control plane service request with an active flag towards the MME encapsulated in a radio resource control (RRC) message to the eNodeB.

At operation 3, the eNodeB may forward the control plane service request with active flag to the MME. If the MME receives the control plane service request with active flag, it shall establish the S1-I bearer and execute the transfer.

At operation 4, the MME may transmit a release access bearers request message to the S-GW that requests the release of all S11-U bearers for the UE.

At operation 5, if the S-GW receives the release access bearers request message, it may release all MME related information for the UE and respond a release access bearers response message to the MME.

At operation 6, the MME may transmit S1-AP initial context setup request message to the eNodeB for all PDN connections that MME has not included control plane only indicator in the EPS session management (ESM) request. The MME may respond to the UE with a service accept message.

At operation 7, the eNodeB may perform the radio bearer establishment procedure. The user plane security may be established at this operation. The UE may need to locally delete any existing robust header compression (ROHC) context used for the control plane CIoT EPS optimization. When the user plane radio bearers are setup, EPS bear state synchronization may be performed between the UE and the network.

At operation 8, as the user plane radio bearer are setup, the UE may use user plane bearers to transfer data PDUs. The uplink data from the UE may now be forwarded by the eNodeB to the S-GW. The S-GW may forward the uplink data to the P-GW.

At operation 9, the eNodeB may transmit an S1-AP message initial context setup complete to the MME.

At operation 10, the MME may transmit a modify bearer request message to the S-GW. If the S-GW supports modify access bearers request procedure and if there is no need for the S-GW to transmit the signaling to the P-GW, the MME may transmit a modify access bearer request to the S-GW to optimize the signaling. The S-GW may now be able to transmit downlink data toward the UE.

At operation 11, the S-GW may return a modify bearer response to the MME as a response to the modify bearer request message, or a modify access bearers response as a response to the modify access bearers request message.

Figure 3:
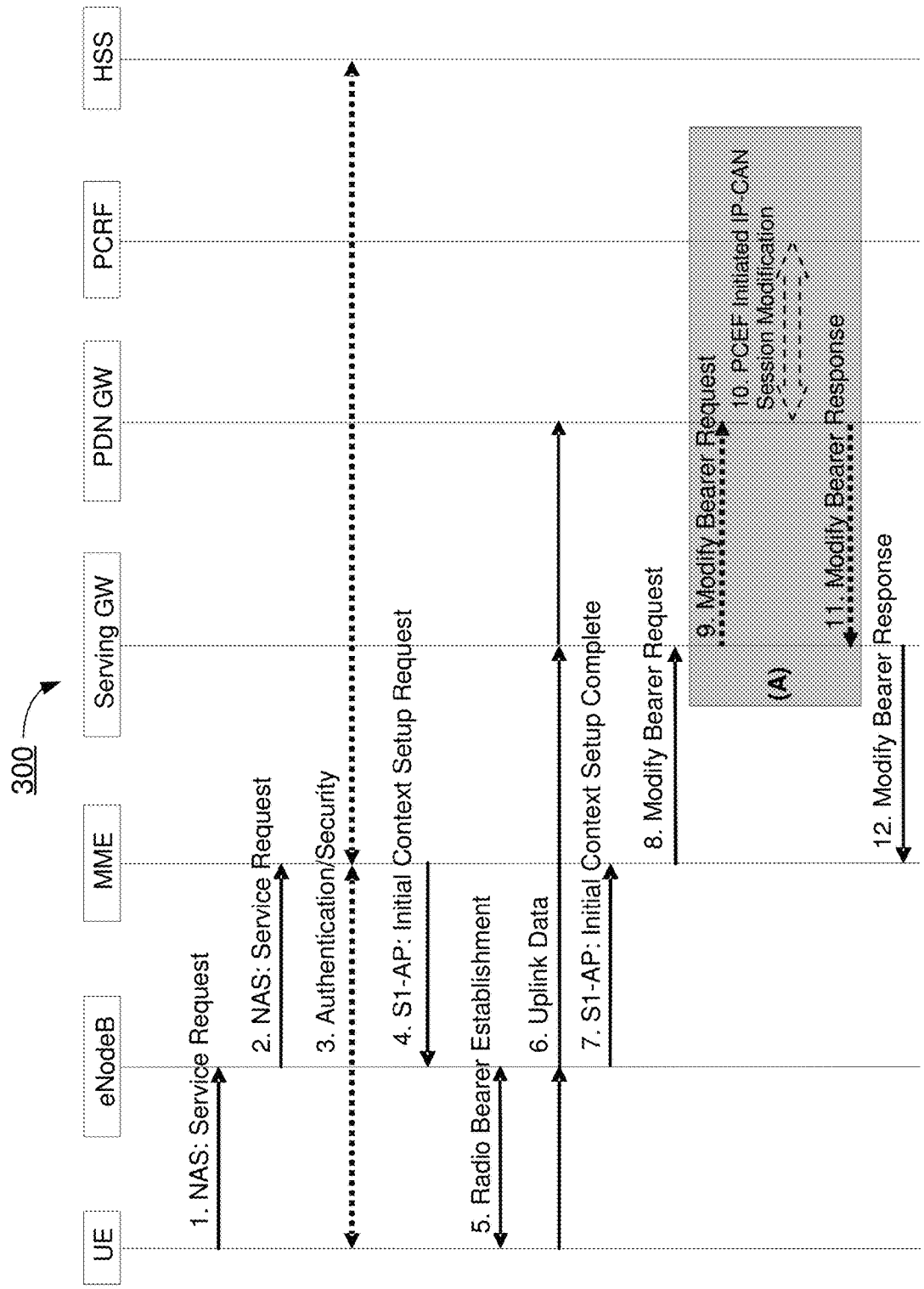
FIG. 3 is a diagram depicting an example scheme under schemes in accordance with implementations of the present disclosure.

FIG. 3 illustrates an example scheme 300 in accordance with implementations of the present disclosure. Scheme 300 may involve a UE and a plurality of network nodes, which may be a part of a wireless communication network (e.g., a GSM network, a UMTS network, an LTE network, an NR network, an IoT network, a CIoT network, an NB-IoT network or an MTC network). Scheme 300 may involve a number of operations and/or steps performed by the UE and/or the network nodes for transmitting user data under congestion control as represented by one or more of operations 1, 2, 3, 4, 5, 6, 7, 8, 9, 10, 11 and 12. Although illustrated as discrete operations, various operations of scheme 300 may be divided into additional sub-operations, combined into fewer operations, or eliminated, depending on the desired implementation.

As described above, the UE may be configured to determine whether a back-off timer (e.g., T3448) is running and determine the connection state of the UE. In scheme 300, the UE may be operated in the idle mode (e.g., ECM_IDLE). After determining that the back-off timer is running and the UE is in the idle mode, the service request procedure may be triggered by the UE to establish user plane radio bearers for the UE. The UE triggered service request procedure may begin at operation 1.

At operation 1, the UE may be configured to transmit the non-access stratum (NAS) message service request toward the MME encapsulated in an RRC message to the eNodeB.

At operation 2, the eNodeB may forward the NAS message to the MME. The NAS message may be encapsulated in an S1-AP: initial UE message.

At operation 3, the NAS authentication/security procedures may be performed among the UE and the network nodes.

At operation 4, the MME may transmit an S1-AP initial context setup request message to the eNodeB. This operation may activate the radio and S1 bearers for all the active EPS Bearers.

At operation 5, the eNodeB may perform the radio bearer establishment procedure. The user plane security may be established at this operation. When the user plane radio bearers are setup, EPS bearer state synchronization may be performed between the UE and the network.

At operation 6, the uplink data from the UE may be forwarded by eNodeB to the serving GW. The eNodeB may transmit the uplink data to the serving GW. The serving GW may forward the uplink data to the PDN GW.

At operation 7, the eNodeB may transmit an S1-AP message initial context setup complete to the MME.

At operation 8, the MME may transmit a modify bearer request message to the Serving GW. If the Serving GW supports the modify access bearers request procedure and if there is no need for the Serving GW to send the signaling to the PDN GW, the MME may transmit the modify access bearers request to the Serving GW to optimize the signaling. The Serving GW may now be able to transmit downlink data toward the UE.

At operation 9, the Serving GW may further transmit the modify bearer request message to the PDN GW under certain conditions.

At operation 10, if dynamic policy and charging control (PCC) is deployed, the PDN GW may interact with the policy and charging rules function (PCRF) to get the PCC rule(s) according to the radio access technology (RAT) type by means of a PCEF initiated internet protocol-connectivity access network (IP-CAN) session modification procedure. If dynamic PCC is not deployed, the PDN GW may apply local quality of service (QoS) policy.

At operation 11, the PDN GW may transmit the modify bearer response to the Serving GW.

At operation 12, the Serving GW may return a modify bearer response to the MME as a response to the modify bearer request message, or a modify access bearers response as a response to the modify access bearers request message.

Figure 4:
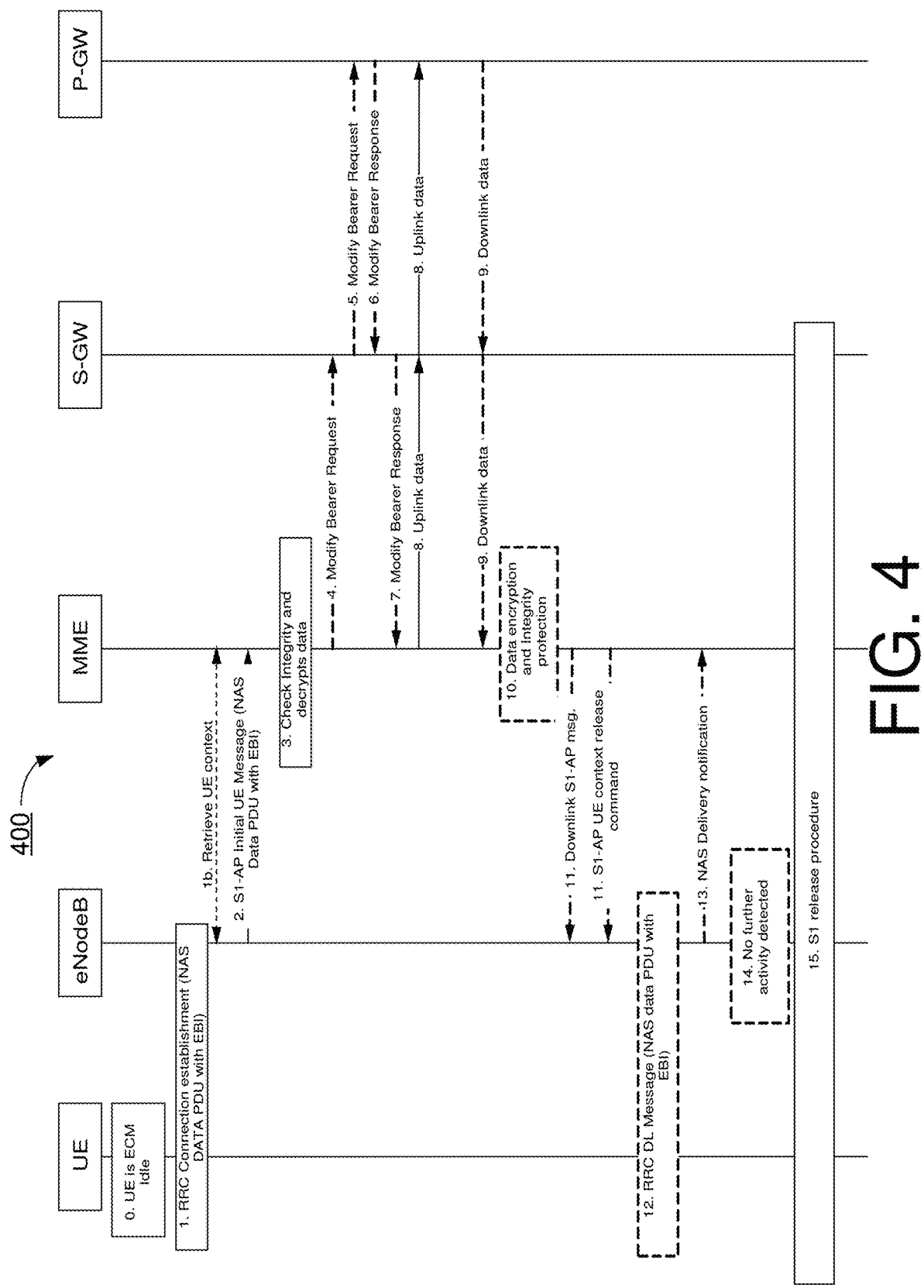
FIG. 4 is a diagram depicting an example scheme under schemes in accordance with implementations of the present disclosure.

FIG. 4 illustrates an example scheme 400 in accordance with implementations of the present disclosure. Scheme 400 may involve a UE and a plurality of network nodes, which may be a part of a wireless communication network (e.g., a GSM network, a UMTS network, an LTE network, an NR network, an IoT network, a CIoT network, an NB-IoT network or an MTC network). Scheme 400 may involve a number of operations and/or steps performed by the UE and/or the network nodes for transmitting user data under congestion control as represented by one or more of operations 1, 2, 3, 4, 5, 6, 7, 8, 9, 10, 11, 12, 13, 14 and 15. Although illustrated as discrete operations, various operations of scheme 400 may be divided into additional sub-operations, combined into fewer operations, or eliminated, depending on the desired implementation.

As described above, when performing the user data transmission on the user plane, the UE may be configured to determine the connection state of the UE and whether a back-off timer (e.g., T3346) is running. In scheme 400, the UE may be operated in the idle mode (e.g., ECM_IDLE). After determining that the back-off timer is running and the UE is in the idle mode, the UE may be configured to perform the user data transmission via the control plane CIoT EPS optimization. Scheme 400 illustrates the operations for establishing control plane connection for the control plane CIoT EPS optimization. Scheme 400 may begin at operation 1.

At operation 1, the UE may establish an RRC connection and transmit as part of it an integrity protected NAS PDU. The NAS PDU may carry the EPS bearer ID and encrypted uplink data.

At operation 1b, in the NB-IoT case, the eNB, based on configuration, may retrieve the EPS negotiated QoS profile from the MME, if not previously retrieved. The eNB may retrieve additional parameters (e.g., UE radio capabilities).

At operation 2, the NAS PDU transmitted in operation 1 may be relayed to the MME by the eNodeB using a S1-AP initial UE message.

At operation 3, the MME may check the integrity of the incoming NAS PDU and decrypt the data it contains. The MME may perform (and the UE may respond to) any EMM or ESM procedures if necessary (e.g. the security related procedures).

At operation 4, if the S11-U connection is not established, the MME may transmit a modify bearer request message to the S-GW. The S-GW may now be able to transmit downlink data toward the UE.

At operation 5, the S-GW may transmit the modify bearer request message to the P-GW under certain conditions.

At operation 6, The P-GW may transmit the modify bearer response to the S-GW.

At operation 7, if a modify bearer request message was transmitted at operation 4, the S-GW shall return a modify bearer response to the MME as a response to the modify bearer request message.

At operation 8, the MME may transmit uplink data to the P-GW via the S-GW.

At operation 9, downlink data may arrive at the P-GW and the P-GW may transmit them to the MME via the S-GW.

At operation 10, if downlink data are received in operation 9, the MME may encrypt and integrity protect the downlink data.

At operation 11, if operation 10 is executed, then downlink data may be encapsulated in a NAS PDU and transmitted to the eNB in a S1-AP downlink message.

At operation 12, the eNB may transmit a RRC downlink data message including the downlink data encapsulated in NAS PDU to the UE.

At operation 13, the eNodeB may transmit a NAS Delivery indication to the MME if requested.

At operation 14, if no NAS PDU activity exists for a while, the eNB may start an S1 release in operation 15.

At operation 15, an S1 release procedure may be triggered by the eNodeB or MME.

Illustrative Implementations

Figure 5:
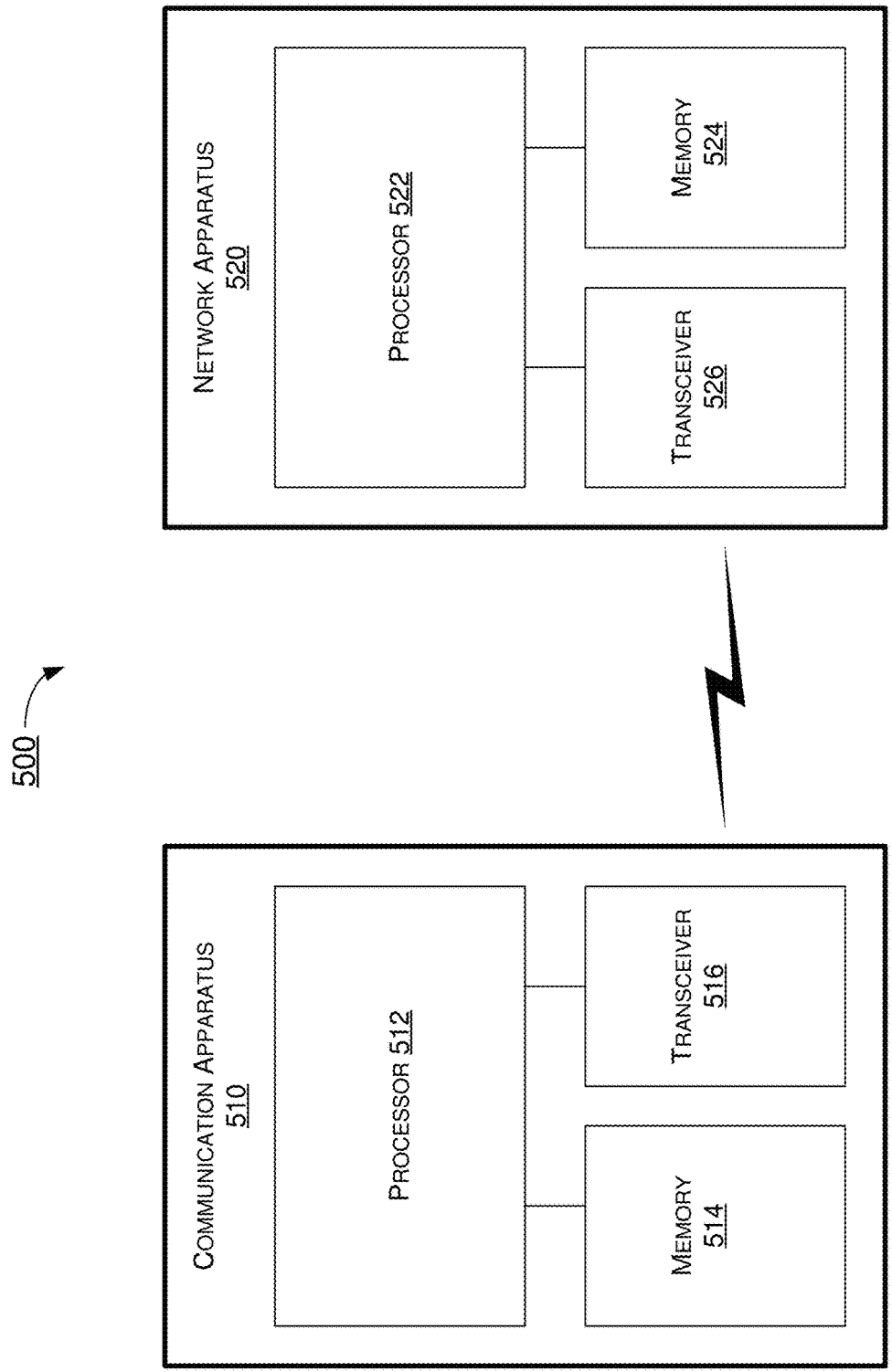
FIG. 5 is a block diagram of an example communication apparatus and an example network apparatus in accordance with an implementation of the present disclosure.

FIG. 5 illustrates an example communication apparatus 510 and an example network apparatus 520 in accordance with an implementation of the present disclosure. Each of communication apparatus 510 and network apparatus 520 may perform various functions to implement schemes, techniques, processes and methods described herein pertaining to transmitting user data under congestion control with respect to user equipment and network apparatus in wireless communications, including schemes 100, 200, 300 and 400 described above as well as processes 600 and 700 described below.

Communication apparatus 510 may be a part of an electronic apparatus, which may be a UE such as a portable or mobile apparatus, a wearable apparatus, a wireless communication apparatus or a computing apparatus. For instance, communication apparatus 510 may be implemented in a smartphone, a smartwatch, a personal digital assistant, a digital camera, or a computing equipment such as a tablet computer, a laptop computer or a notebook computer. Communication apparatus 510 may also be a part of a machine type apparatus, which may be an IoT, CIoT or NB-IoT apparatus such as an immobile or a stationary apparatus, a home apparatus, a wire communication apparatus or a computing apparatus. For instance, communication apparatus 510 may be implemented in a smart thermostat, a smart fridge, a smart door lock, a wireless speaker or a home control center. Alternatively, communication apparatus 510 may be implemented in the form of one or more integrated-circuit (IC) chips such as, for example and without limitation, one or more single-core processors, one or more multi-core processors, or one or more complex-instruction-set-computing (CISC) processors. Communication apparatus 510 may include at least some of those components shown in FIG. 5 such as a processor 512, for example.

Communication apparatus 510 may further include one or more other components not pertinent to the proposed scheme of the present disclosure (e.g., internal power supply, display device and/or user interface device), and, thus, such component(s) of communication apparatus 510 are neither shown in FIG. 5 nor described below in the interest of simplicity and brevity.

Network apparatus 520 may be a part of an electronic apparatus, which may be a network node such as a base station, a small cell, a router or a gateway. For instance, network apparatus 520 may be implemented in a base station in a GSM or UMTS network, in an eNodeB in an LTE, LTE-Advanced or LTE-Advanced Pro network or in a gNB in a 5G, NR, IoT, CIoT or NB-IoT network. Alternatively, network apparatus 520 may be implemented in the form of one or more IC chips such as, for example and without limitation, one or more single-core processors, one or more multi-core processors, or one or more CISC processors. Network apparatus 520 may include at least some of those components shown in FIG. 5 such as a processor 522, for example. Network apparatus 520 may further include one or more other components not pertinent to the proposed scheme of the present disclosure (e.g., internal power supply, display device and/or user interface device), and, thus, such component(s) of network apparatus 520 are neither shown in FIG. 5 nor described below in the interest of simplicity and brevity.

In one aspect, each of processor 512 and processor 522 may be implemented in the form of one or more single-core processors, one or more multi-core processors, or one or more CISC processors. That is, even though a singular term "a processor" is used herein to refer to processor 512 and processor 522, each of processor 512 and processor 522 may include multiple processors in some implementations and a single processor in other implementations in accordance with the present disclosure. In another aspect, each of processor 512 and processor 522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 512 and processor 522 is a special-purpose machine specifically designed, arranged and configured to perform specific tasks including power consumption reduction in a device (e.g., as represented by communication apparatus 510) and a network (e.g., as represented by network apparatus 520) in accordance with various implementations of the present disclosure.

In some implementations, communication apparatus 510 may also include a transceiver 516 coupled to processor 512 and capable of wirelessly transmitting and receiving data. In some implementations, communication apparatus 510 may further include a memory 514 coupled to processor 512 and capable of being accessed by processor 512 and storing data therein. In some implementations, network apparatus 520 may also include a transceiver 526 coupled to processor 522 and capable of wirelessly transmitting and receiving data. In some implementations, network apparatus 520 may further include a memory 524 coupled to processor 522 and capable of being accessed by processor 522 and storing data therein. Accordingly, communication apparatus 510 and network apparatus 520 may wirelessly communicate with each other via transceiver 516 and transceiver 526, respectively. To aid better understanding, the following description of the operations, functionalities and capabilities of each of communication apparatus 510 and network apparatus 520 is provided in the context of a mobile communication environment in which communication apparatus 510 is implemented in or as a communication apparatus or a UE and network apparatus 520 is implemented in or as a network node of a communication network.

In some implementations, processor 512 may be configured to establish, via transceiver 516, at least one connection with network apparatus 520. Processor 512 may establish the connection on the control plane or on the user plane. For example, processor 512 may establish the connection solely on the control plane. Alternatively, processor 512 may establish the connection solely on the user plane.

In some implementations, processor 512 may be configured to initiate user data transmission from communication apparatus 510 to network apparatus 520. Processor 512 may be configured to determine a preferred domain for the user data transmission. Processor 512 may choose one of the control plane domain or the user plane domain. Processor 512 may determine the preferred domain according to its preferences/configurations. For example, in a case that the user data is small, processor 512 may choose the control plane for the user data transmission. Processor 512 may also determine the preferred domain according to the network capabilities. For example, some networks may only support one of the control plane or the user plane. Processor 512 may only choose the supported domain for the user data transmission.

In some implementations, processor 512 may determine the control plane connection for the user data transmission. Processor 512 may further be configured to determine whether a back-off timer is running. The back-off timer may be, for example and without limitations, a control plane data back-off timer T3448. Processor 512 may not be able to transmit the user data via the control plane connection when the back-off timer is running. Processor 512 may need to determine whether T3448 is running before transmitting the user data.

In some implementations, after determining that the back-off timer is not running, processor 512 may be configured to follow the normal process. In the normal process, processor 512 may be able to transmit, via transceiver 516, the user data via the control plane connection.

In some implementations, after determining that the back-off timer is running, processor 512 may further be configured to determine the UE connection state. When the back-off timer is running, processor 512 may be disallowed to transmit the user data via the control plane connection. Processor 512 may be configured to try to transmit the user data via an alternative connection (e.g., the user plane connection). Processor 512 may need to establish the user plane connection. However, the network side may have different procedures for establishing the user plane connection depending on the connection state of processor 512. The UE connection state may comprise an idle mode or a connected mode. Processor 512 may need to transmit the correct message for establishing the user plane connection based on the connection state of processor 512.

In some implementations, processor 512 may determining that it is operated in the idle mode. Processor 512 may be configured to transmit, via transceiver 516, a service request message to establish the S1-U bearer. In order to transmit the use data via the user plane connection, processor 512 may need to establish the S1-U bearer. The service request message may be used for establishing the S1-U bearer in the idle mode. After the S1-U bearer is established, processor 512 may be configured to transmit the user data via the user plane connection. Processor 512 may keep transmitting the user data via the user plane connection even after the back-off timer is expired.

In some implementations, processor 512 may determining that it is operated in the connected mode. Processor 512 may be configured to transmit, via transceiver 516, a control plane service request message with active flag to establish the S1-U bearer. The control plane service request message with active flag may be used for establishing the S1-U bearer in the connected mode. After the S1-U bearer is established, processor 512 may be configured to transmit the user data via the user plane connection. Processor 512 may keep transmitting the user data via the user plane connection even after the back-off timer is expired.

In some implementations, after choosing the user plane connection for the user data transmission, processor 512 may establish, via transceiver 516, the user plane connection with network apparatus 520. When processor 512 needs to transmit the user data, processor 512 may further need to determine whether processor 512 is in the connected mode or in the idle mode.

In some implementations, processor 512 may determining that it is operated in the connected mode. Processor 512 may be configured to follow the normal process. When processor 512 is operated in the connected mode, processor 512 may be allowed to transmit the user data. In the normal process, processor 512 may be able to transmit the user data via the user plane connection.

In some implementations, processor 512 may determining that it is operated in the idle mode. Processor 512 may further be configured to determine whether a back-off timer is running. Processor 512 may not be able to transmit the user data via the user plane connection when the back-off timer is running. The back-off timer may be, for example and without limitations, a mobility management back-off timer T3346. Therefore, processor 512 may need to determine whether T3346 is running before transmitting the user data.

In some implementations, processor 512 may determining that the back-off timer is not running. Processor 512 may be configured to follow the normal process. In the normal process, processor 512 may be able to transmit the user data via the user plane connection.

In some implementations, processor 512 may determining that the back-off timer is running. Processor 512 may be configured to transmit, via transceiver 516, the user data via the control plane CIoT EPS optimization. Specifically, in a case that the back-off timer is running, processor 512 may be disallowed to transmit the user data via the user plane connection. Processor 512 may be configured to try to transmit the user data via an alternative connection (e.g., the control plane connection). Processor 512 may be configured to establish the control plane connection and transmit the user data via the control plane connection (i.e., the control plane CIoT EPS optimization). Processor 512 may keep transmitting the user data via the control plane connection even after the back-off timer is expired.

Illustrative Processes

Figure 6:
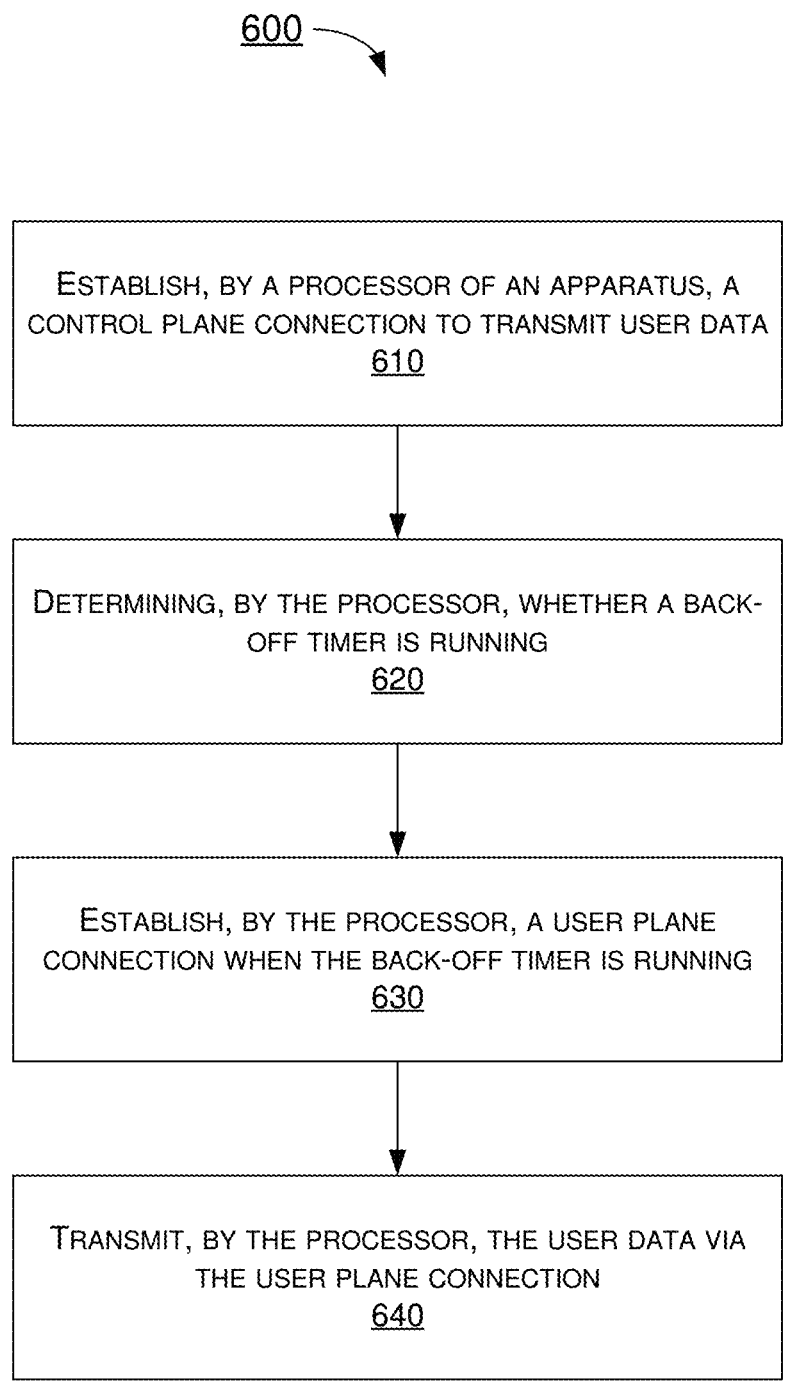
FIG. 6 is a flowchart of an example process in accordance with an implementation of the present disclosure.

FIG. 6 illustrates an example process 600 in accordance with an implementation of the present disclosure. Process 600 may be an example implementation of scenarios described above, whether partially or completely, with respect to transmitting user data under congestion control in accordance with the present disclosure. Process 600 may represent an aspect of implementation of features of communication apparatus 510. Process 600 may include one or more operations, actions, or functions as illustrated by one or more of blocks 610, 620, 630 and 640. Although illustrated as discrete blocks, various blocks of process 600 may be divided into additional blocks, combined into fewer blocks, or eliminated, depending on the desired implementation. Moreover, the blocks of process 600 may executed in the order shown in FIG. 6 or, alternatively, in a different order. Process 600 may be implemented by communication apparatus 510 or any suitable UE or machine type devices. Solely for illustrative purposes and without limitation, process 600 is described below in the context of communication apparatus 510. Process 600 may begin at block 610.

At 610, process 600 may involve processor 512 of communication apparatus 510 establishing a control plane connection to transmit user data. Process 600 may proceed from 610 to 620.

At 620, process 600 may involve processor 512 determining whether a back-off timer is running. Process 600 may proceed from 620 to 630.

At 630, process 600 may involve processor 512 establishing a user plane connection when the back-off timer is running. Process 600 may proceed from 630 to 640.

At 640, process 600 may involve processor 512 transmitting the user data via the user plane connection.

In some implementations, the back-off timer may comprise a T3448 back-off timer.

In some implementations, process 600 may involve processor 512 transmitting a service request message when the apparatus is in an idle mode for establishing the user plane connection.

In some implementations, process 600 may involve processor 512 transmitting a control plane service request message with active flag when the apparatus is in a connected mode for establishing the user plane connection.

In some implementations, the user plane connection may comprise a S1-U bearer.

In some implementations, process 600 may involve processor 512 transmitting the user data via the user plane connection after the back-off timer is expired.

Figure 7:
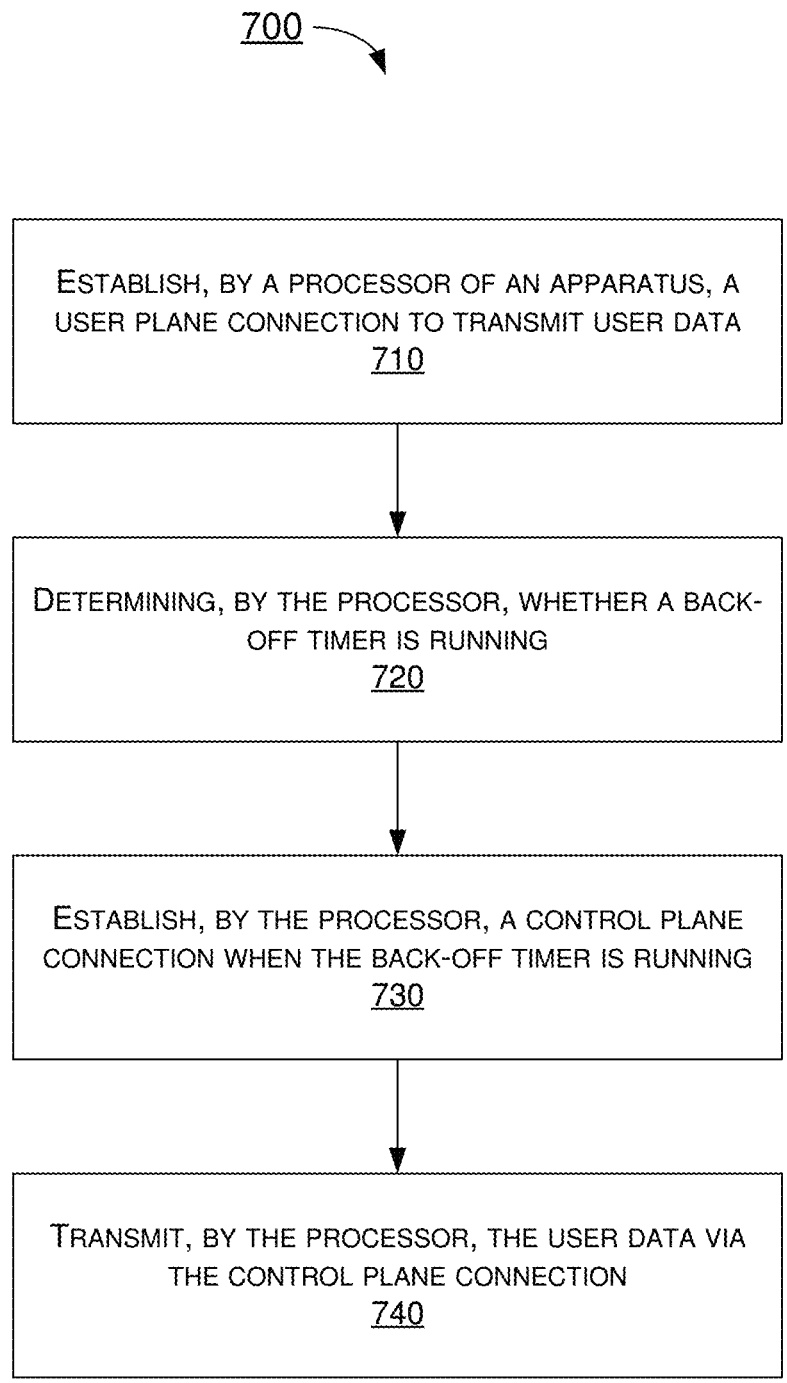
FIG. 7 is a flowchart of an example process in accordance with an implementation of the present disclosure.

FIG. 7 illustrates an example process 700 in accordance with an implementation of the present disclosure. Process 700 may be an example implementation of scenarios described above, whether partially or completely, with respect to transmitting user data under congestion control in accordance with the present disclosure. Process 700 may represent an aspect of implementation of features of communication apparatus 510. Process 700 may include one or more operations, actions, or functions as illustrated by one or more of blocks 710, 720, 730 and 740. Although illustrated as discrete blocks, various blocks of process 700 may be divided into additional blocks, combined into fewer blocks, or eliminated, depending on the desired implementation. Moreover, the blocks of process 700 may executed in the order shown in FIG. 7 or, alternatively, in a different order. Process 700 may be implemented by communication apparatus 510 or any suitable UE or machine type devices. Solely for illustrative purposes and without limitation, process 700 is described below in the context of communication apparatus 510. Process 700 may begin at block 710.

At 710, process 700 may involve processor 512 of communication apparatus 510 establishing a user plane connection to transmit user data. Process 700 may proceed from 710 to 720.

At 720, process 700 may involve processor 512 determining whether a back-off timer is running. Process 700 may proceed from 720 to 730.

At 730, process 700 may involve processor 512 establishing a control plane connection when the back-off timer is running. Process 700 may proceed from 730 to 740.

At 740, process 700 may involve processor 512 transmitting the user data via the control plane connection.

In some implementations, the back-off timer may comprise a T3346 back-off timer.

In some implementations, process 700 may involve processor 512 transmitting the user data via control plane CIoT EPS optimization.

In some implementations, process 700 may involve processor 512 determining that the apparatus is in an idle mode.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   determining, by a processor of an apparatus, one of a control plane and a user plane to transmit user data;
   establishing, by the processor, a control plane connection to transmit the user data responsive to determining the control plane to transmit the user data;
   determining, by the processor, whether a back-off timer is running; and
   performing, by the processor:
   responsive to determining that the back-off timer is not running, transmitting the user data via the control plane connection; and
   responsive to determining that the back-off timer is running, performing operations comprising:
   transmitting the user data via a user plane connection; and
   continuing to transmit the user data via the user plane connection after the back-off timer is expired.

2. The method of claim 1, wherein the back-off timer comprises a T3448 back-off timer.

3. The method of claim 1, wherein the establishing the user plane connection comprises transmitting a service request message when the apparatus is in an idle mode.

4. The method of claim 1, wherein the establishing the user plane connection comprises transmitting a control plane service request message with an active flag when the apparatus is in a connected mode.

5. The method of claim 1, wherein the user plane connection comprises a S1-U bearer.

6. The method of claim 1, further comprising:
   transmitting, by the processor, the user data via the user plane connection after the back-off timer is expired.

7. A method, comprising:
   determining, by a processor of an apparatus, a user plane to transmit user data;
   determining, by the processor, whether a back-off timer is running; and
   performing, by the processor:
   responsive to determining that the back-off timer is not running, transmitting the user data via the user plane connection; and
   responsive to determining that the back-off timer is running, performing operations comprising:
   transmitting the user data via a control plane connection; and
   continuing to transmit the user data via the control plane connection after the back-off timer is expired.

8. The method of claim 7, wherein the back-off timer comprises a T3346 back-off timer.

9. The method of claim 7, wherein the transmitting the user data via the control plane connection comprises transmitting the user data via control plane cellular internet of things (CIoT) evolved packet system (EPS) optimization.

10. The method of claim 7, further comprising:
    transmitting, by the processor, the user data via the control plane connection after expiry of the back-off timer.

11. An apparatus, comprising:
a transceiver capable of wirelessly communicating with a plurality of nodes of a wireless network; and
a processor communicatively coupled to the transceiver, the processor capable of:
- determining one of a control plane and a user plane to transmit user data;
- establishing, via the transceiver, a control plane connection to transmit the user data responsive to determining the control plane to transmit the user data;
- determining whether a back-off timer is running;
- performing:
  - responsive to determining that the back-off timer is not running, transmitting, via the transceiver, the user data via the control plane connection; and
  - responsive to determining that the back-off timer is running, performing operations comprising:
    - establishing, via the transceiver, a user plane connection;
    - transmitting, via the transceiver, the user data via the user plane connection; and
    - continuing to transmit, via the transceiver, the user data via the user plane connection after the back-off timer is expired.

12. The apparatus of claim 11, wherein the back-off timer comprises a T3448 back-off timer.

13. The apparatus of claim 11, wherein, in the establishing the user plane connection, the processor is further capable of transmitting a service request message when the apparatus is in an idle mode.

14. The apparatus of claim 11, wherein, in the establishing the user plane connection, the processor is further capable of transmitting a control plane service request message with an active flag when the apparatus is in a connected mode.

15. The apparatus of claim 11, wherein the user plane connection comprises a S1-U bearer.

16. An apparatus, comprising:
a transceiver capable of wirelessly communicating with a plurality of nodes of a wireless network; and
a processor communicatively coupled to the transceiver, the processor capable of:
- determining a user plane to transmit user data based on a size of the user data or network capabilities;
- determining whether a back-off timer is running; and
- performing, by the processor:
  - responsive to determining that the back-off timer is not running, transmitting, via the transceiver, the user data via the user plane connection; and
  - responsive to determining that the back-off timer is running, performing operations comprising:
    - establishing, via the transceiver, a control plane connection;
    - transmitting, via the transceiver, the user data via the control plane connection; and
    - continuing to transmit, via the transceiver, the user data via the control plane connection after the back-off timer is expired.

17. The apparatus of claim 16, wherein the back-off timer comprises a T3346 back-off timer.

18. The apparatus of claim 16, wherein, in the transmitting the user data via the control plane connection, the processor is further capable of transmitting the user data via control plane cellular internet of things (CIoT) evolved packet system (EPS) optimization.

* * * * *